July 5, 1955

H. E. POTTER ET AL 2,712,156

TIRE RETREADING APPARATUS

Filed Oct. 11, 1952

INVENTORS,
HARRIS E. POTTER,
ZEB MATTOX
and JAMES ORMAND MATTOX.

BY Eaton + Bell

ATTORNEYS

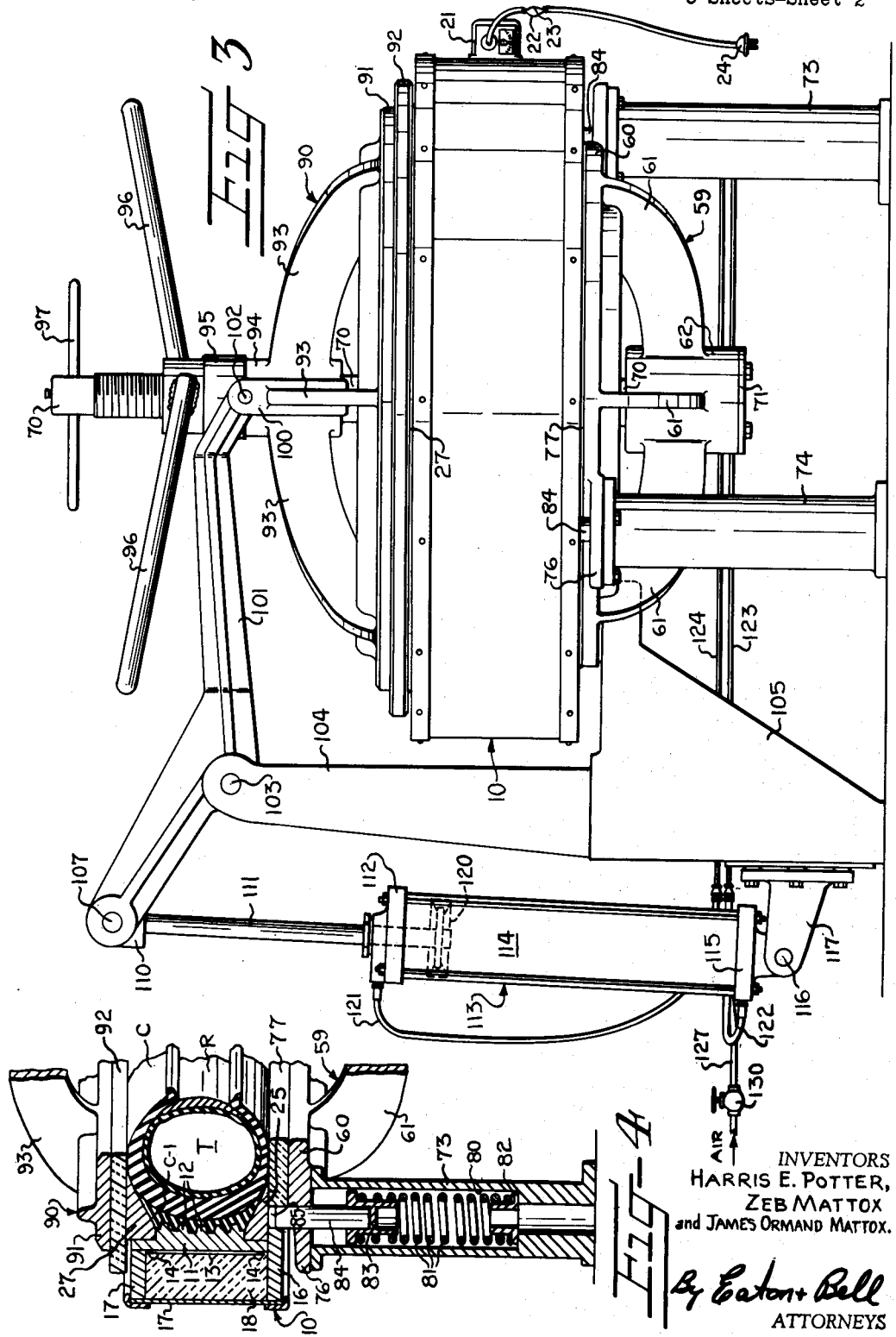

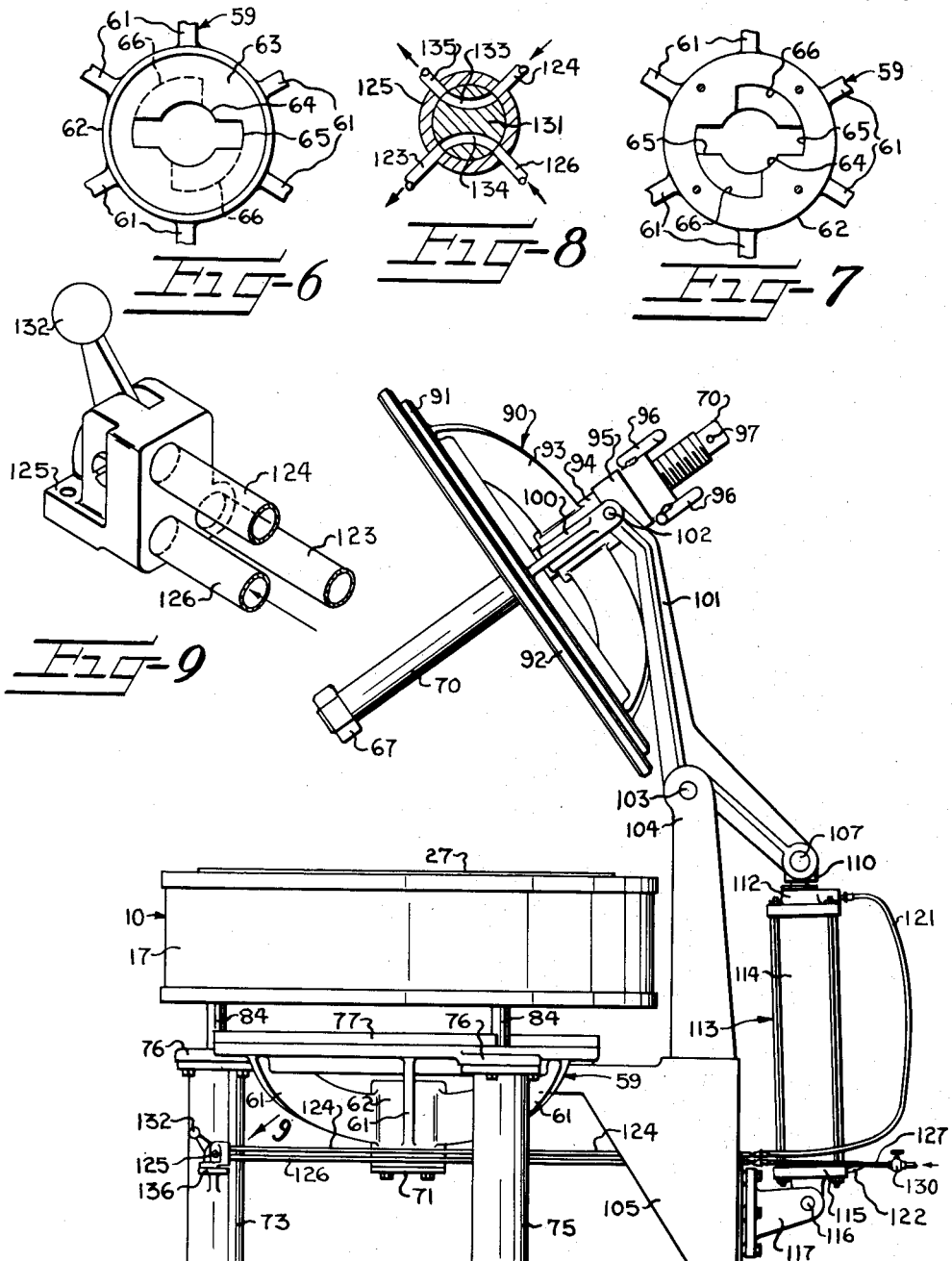

United States Patent Office 2,712,156
Patented July 5, 1955

2,712,156

TIRE RETREADING APPARATUS

Harris E. Potter, Zeb Mattox, and James Ormand Mattox, Charlotte, N. C., assignors, by direct and mesne assignments, to Precision Recapping Equipment Company, a corporation of Georgia Application October 11, 1952, Serial No. 314,366

1 Claim. (Cl. 18—18)

This invention relates to an apparatus for recapping and/or retreading tires and it is the primary object of this invention to provide an improved mold machine especially adapted for supporting a continuous annular mold matrix and wherein improved means are provided for lifting and supporting the matrix in spaced relation to the base of the machine while the tire casing with the tread strip thereon is positioned in the matrix. Means coact with the matrix supporting means, for automatically applying pressure to a removable upper side flange of the matrix while simultaneously moving the matrix downwardly against the base of the machine, thus obviating the necessity of first releasing the matrix supporting means for lowering said matrix and subsequently positioning the means for applying pressure to the upper removable flange of the matrix on said matrix.

The present invention is more particularly concerned with the types of mold matrices disclosed in various patents, such as the patent to Napier, No. 2,475,579 of July 5, 1949, and the patent to MacMillan, No. 2,267,243 of December 23, 1941.

In tire recapping apparatuses heretofore in use, and in association with which continuous annular types of mold matrices, such as that disclosed in said Patent No. 2,475,579, have been used, the annular mold matrix is first positioned upon the base of the machine and, in order to facilitate inserting the tire casing in the mold matrix, it is then necessary to spread the beads of the tire casing apart from each other by means of a pair of bead engaging rims with means for moving them axially away from one another, in order to reduce the diameter of the casing to the extent that it, including the attached tread strip, can be freely inserted into the mold matrix prior to molding, or withdrawn from the mold matrix after molding.

Heretofore a manually operable lifting means has been provided for lifting and maintaining the matrix in spaced relation above the base of the machine, and thereafter, it has been necessary to release the lifting means and, after the casing with its tread strip had been inserted into the mold matrix prior to molding, it has been necessary to release said lifting means to lower the matrix into engagement with the base of the machine. Such matrices are provided with an upper annular side flange inserted in the upper portion of the matrix, which annular flange terminates in a sharp annular shoulder and against which shoulder the casing must be intimately pressed to form with said shoulder a seal defining the limit of the mold chamber.

Then, in order to maintain the upper side flange against the tire casing during the molding operation, after the bead engaging rims had been removed from the casing, it has been necessary to position a removable center post in the base of the machine, which extended upwardly axially through and beyond the tire casing, and to then position a relatively heavy clamping member against the upper surface of said upper side flange with said vertical center post extending therethrough. Thereafter, a clamping nut was threadably mounted on the upper end of the center post and tightened against the clamping member to, in turn, clamp the upper side flange against the matrix and against the tire casing disposed in the matrix.

It is thus seen that, heretofore, a substantial number of operations have been required in order to properly position the tire casing in the endless annular mold matrix and, these same operations would have to be reversed in removing the tire casing from the matrix after molding. This has, necessarily, been a time consuming and costly procedure, notwithstanding the fact that it has been necessary for the operators of such types of recapping and retreading apparatuses, as that described, to purchase expensive overhead tracks and lifting devices for raising and lowering the clamping member relative to the matrices, these clamping members usually being too heavy to be handled manually without the assistance of a mechanical lifting device, due to the excessive pressures to which they are subjected by the tire casing during the molding operation.

It is, therefore, another object of this invention to provide a tire recapping machine which is much more facile and efficient in its manner of operation than that chacterized by other recapping apparatuses heretofore employed, to the extent that many of the operations heretofore required in operating the usual type of recapping apparatuses, as above set forth have been eliminated.

More specifically, it is an object of this invention to provide an improved tire recapping machine comprising a base in which a plurality of circularly arranged vertically movable plungers or lifting members are disposed and which lifting members are resiliently urged upwardly under sufficient pressure to support the continuous annular mold matrix in spaced relation above the upper surface of the base of the machine thereby facilitating the insertion of the tire casing in the matrix, after which the casing spreading unit could be removed from the tire casing and the machine.

A clamping member or turret is pivotally supported by the machine and a manually operable mechanical means, in the form of an air cylinder, is then operated to swing the clamping member from a position spaced above and somewhat to one side of the vertical axis of the matrix to clamping position against the upper surface of the upper annular side flange, positioned against the upper surface of the tire casing in the mold matrix, to move the mold matrix downwardly in engagement with the vertically movable plungers or lifting members until the mold matrix rests against the upper surface of the base of the machine, to thereby clamp the upper side flange against the tire casing and the mold matrix while simultaneously lowering the mold matrix into molding position.

On the other hand, after molding, it is merely necessary to mechanically swing the clamping member or turret upwardly to its original position and, with upward movement of the clamping member or turret, the plungers or lifting members will simultaneously raise the matrix to a position in spaced relation to the base of the machine, whereupon the casing spreading unit may again be utilized to reduce the diameter of the tire casing and to facilitate free withdrawal of the casing from the mold matrix.

Some of the objects of the invention having been stated, other objects will appear as the description proceeds, when taken in connection with the accompanying drawings in which—

Figure 3 is a side elevation of the improved tire recapping machine looking at the side of Figure 1 nearest the top of the sheet of drawings and showing the matrix clamped against the base;

Figure 4 is a fragmentary vertical sectional view similar to the left-hand portion of Figure 2, but showing the matrix clamped in lowered or molding position against the upper surface of the base of the machine;

Figure 5 is an elevation looking at the opposite side of the tire recapping machine from that shown in Figure 3 and being at a reduced scale, but showing the clamping member or turret and the mold matrix in raised position preparatory to a tire casing being inserted therein or withdrawn therefrom;

Figure 6 is a fragmentary plan view of the hub of the base of the machine taken substantially along the line 6—6 in Figure 2;

Figure 7 is an enlarged fragmentary inverted plan view, with parts in section, taken substantially along the line 7—7 in Figure 2;

Figure 8 is a schematic diagram of the valve and pipes connected thereto for controlling the air cylinder to raise and lower the clamping member or turret;

Figure 9 is an enlarged isometric view of the valve shown in the lower left-hand portion of Figure 5 and showing portions of the three pipes extending therefrom.

Figure 2:
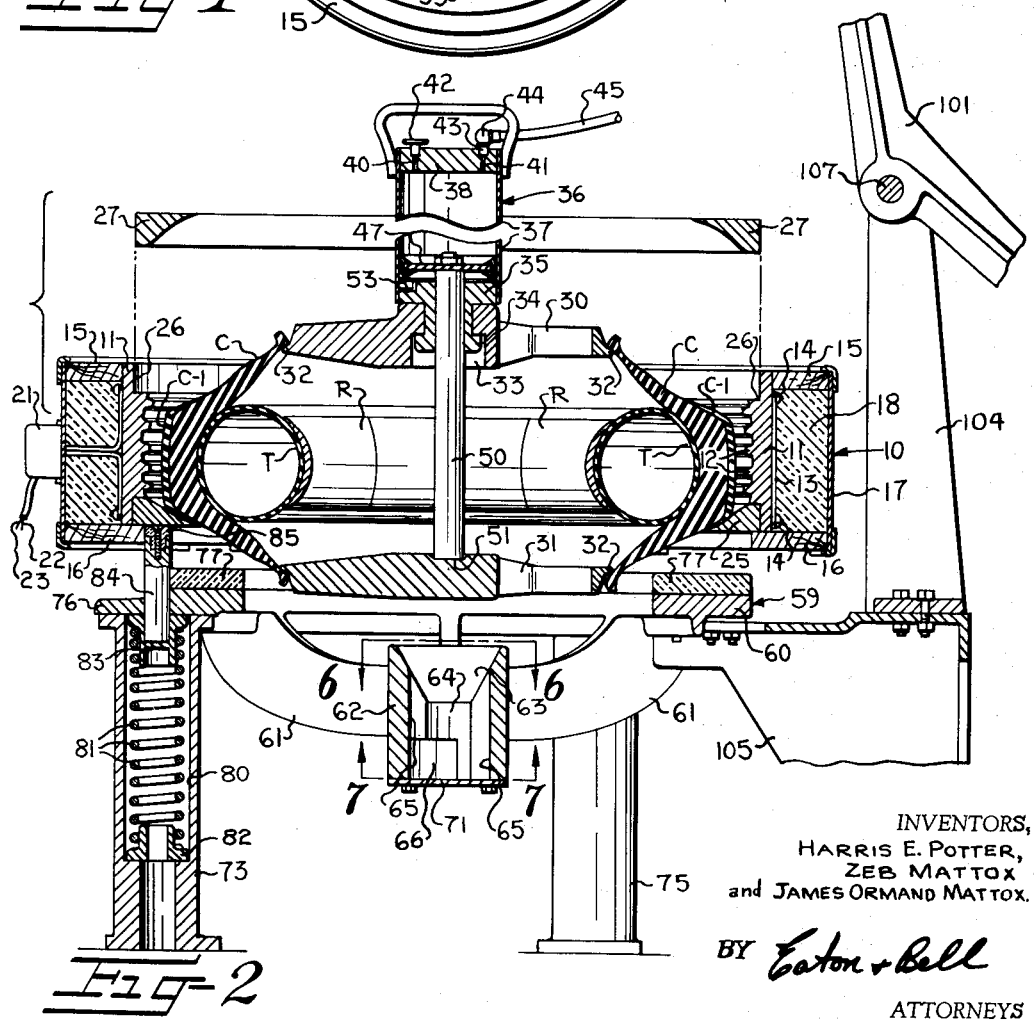
Figure 2 is an enlarged longitudinal vertical sectional view through the improved tire recapping apparatus with parts broken away, showing casing spreading unit in the tire casing as the tire casing is being inserted into the mold matrix and showing the upper side flange of the matrix spaced thereabove preparatory to being inserted in the matrix against the upper surface of the tire casing.

The present tire recapping and/or retreading machine is particularly designed to be used in association with matrices substantially of the type disclosed in said Patents Nos. 2,267,243 and 2,475,579 for recapping and/or retreading pneumatic tire casings, such as the casing C shown in cross-section in Figures 2 and 4, and to which a tread strip C-1 has been adhesively applied. The conventional outer mold matrix is broadly designated at 10 and, since the present invention coacts with the matrix 10, the matrix 10 will first be described in detail.

The outer mold matrix 10 comprises an undivided or annular metallic heat transmitting mold member 11 having an inner tread face with projecting ridges 12. The outer face of the mold member 11 is preferably provided with an electric heating element 13 in close proximity thereto, but insulated therefrom by being mounted on insulating knobs 14 fixed to the mold member 11 and arranged to distribute the heat element 13 uniformly over the surface of the mold member. Although the mold member is shown as being electrically heated in the present drawings, it is to be understood that any suitable means may be provided for heating the mold member.

The heating element 13 is enclosed in an annular boxing comprising flat upper and lower rings 15 and 16, the upper ring 15 being suitably secured to the periphery of the mold member 11 with its upper face substantially flush with the upper face of the mold member 11, and the lower ring 16 being suitably secured to the lower edge of the mold member 11. The rings 15 and 16 are of substantially the same outside diameter and have suitably secured thereto a cylindrical shell 17 thus defining an annular cavity which is filled with a suitable insulating material 18, such as rock wool or the like.

In the interest of heat conservation, the rings 15 and 16 are preferably made of nonmetallic material, while the shell 17 may be of sheet material, either metal or otherwise. Opposite ends of the heating element 13 may be connected to a suitable thermostatically controlled switch 21 suitably secured to the outer face of the cylindrical shell 17 and from whence a cable having wires 22 and 23 therein (Figure 3) extends to a plug 24 adapted to be connected to a suitable source of electrical energy, not shown.

The mold member 11 has a lower side flange 25 extending inwardly beyond the peaks of the ridges 12, which flange 25 may be integral with the mold member 11 or fitted in the lower portion thereof, as shown in Figures 2 and 4. The mold member 11 also has a peripheral rabbet or groove 26 in the upper inner edge thereof in which a removable upper side flange 27 may be freely seated. Since the removable upper flange 27 must be clamped in the groove 26 during the molding process, the depth of the groove 26 is necessarily slightly less than the thickness or height of the flange 27 at the outer portion thereof. The flanges 25 and 27 extend inwardly for a distance which defines the inner limit of the molding chamber.

As stated in said Patent No. 2,475,579, the inner diameter of the mold matrix measured between the tops of the tread ridges is less than the diameter of the casing C with the uncured tread strip attached, so as to avoid stretching of the casing in the curing operation to make the tread strip fill the mold. However, the mold matrix is sufficiently large to encompass the casing with tread strip attached without compressing the casing when the thickness of the tread strip has been reduced by the flow of part of the substance thereof into the grooves between the ridges 12, to fill the same so that, in the finished uninflated tire, the casing is not circumferentially constricted by the tread strip, while the latter will not be under tension when the tire is inflated.

Accordingly, the diameter of the tire casing C must be reduced when the tire casing C is inserted in the mold. This may be accomplished by the means disclosed in said Patent No. 2,475,579, and, in the present instance, a similar means to this end is also provided. The means for reducing the diameter of the casing C is of a type disclosed in the co-pending application of Zeb Mattox and James Ormand Mattox, Serial No. 330,089, filed January 7, 1953, and entitled Tire Bead Spreading Device, and includes upper and lower rims or bead spreading wheels 30 and 31 (Figure 2) each of which has a peripheral bead spreading flange 32 integral therewith.

The hub of the upper bead spreading wheel 30 has a bayonet slot 33 therein in which a key portion 34 of a cylinder base 35 may be positioned. The base 35 forms a part of a cylinder assembly designated broadly at 36. One end of a cylinder tube 37 is fixed to the cylinder base 35 and the other end of the cylinder tube 37 has a cylinder head 38 suitably secured thereto which is provided with apertures 40 and 41, the aperture 40 being closed by a manually operable pressure release valve 42 of any desired construction and the aperture 41 being closed by an air ingress check valve 43 of the type usually provided with pneumatic tire tubes, and to which the usual type of air chuck 44, on one end of an air hose 45, may be connected for directing air under pressure into the cylinder 36.

The cylinder tube 37 has a piston 47 mounted for longitudinal sliding movement therein, to which one end of the piston rod 50 is suitably secured. The piston rod 50 slidably penetrates the cylinder base 35 and is adapted to seat in a circular cavity 51 formed in the upper face of the hub of the lower bead spreading wheel 31. Thus, when the valve 42 is closed and compressed air is directed through the check valve 43 and aperture 41 into the cylinder tube 37, the piston 47 and piston rod 50 move relative to the cylinder tube 37 and force the spreader wheels 30 and 31 apart from each other.

The bead spreading flanges 32 are slightly larger in diameter than the opening in the casing C surrounded by the beads. Thus, an inflatable tube or air bag T, in collapsed condition, may be inserted in the casing to which the uncured tread strip has been cemented after which the usual curing rim R may be placed in the casing against the outer surface of the tube T. Any desired type of curing rim may be employed, two typical forms of curing rims being shown in the patent to Napier No. 2,398,151. Accordingly, a further detailed description of the curing rim is deemed unnecessary.

The flanges 32 of the bead spreading wheels 30 and 31 may then be inserted in the openings surrounded by the beads of the tire casing C, as shown in Figure 2, whereupon the cylinder assembly 36 may be positioned on the upper bead spreading wheel 30 by means of a suitable handle 52 provided for this purpose. Thus, upon compressed air being directed into the cylinder tube 37, the piston 47 and piston rod 50 move relative to the cylinder tube 37 and the cylinder base 35 and the key 34 on the cylinder base 35 will then cause the bead spreading wheels 30 and 31 to move apart from each other substantially as shown in Figure 2 to thereby reduce the outside diameter of the tire casing C and the tire casing may then be readily inserted in the mold member 11.

The cylinder base 35 is provided with a passageway 53 therein to permit egress and ingress of air in the lower portion of the cylinder tube 37. After the tire casing C has been inserted in the mold member 11 in the manner described, the valve 42 may then be opened to permit the compressed air to escape from the tube 37 through the aperture 40 and valve 42, thus permitting the bead spreader wheels 30 and 31 to again move towards each other until the beads of the tire casing C have returned to their normal positions as shown in Figure 4. The cylinder assembly and the bead spreading wheels 30 and 31 are then removed from the casing and the upper side flange 27 is then inserted in the groove 26 in the mold member 11 preparatory to the molding or curing operation.

The parts heretofore described do not necessarily constitute parts of the present invention and are described only in order that a clear understanding may be had of the present invention.

The improved tire recapping machine includes a frame comprising a base 59 having an annular portion or ring 60 which has formed integral therewith the outer ends of a plurality of circularly spaced, inwardly and radially extending arcuate arms or spokes 61 whose inner ends are connected to a common hub 62 which is also preferably cast integral with said radial arms or spokes 61. The upper end of the hub 62 of the annular base 59 has an inverted frusto-conical cavity 63 therein, the lower end of which terminates in an axial substantially circular bore 64 provided with key slots 65 at opposite sides thereof.

The lower end of the hub 62 has diametrically opposed substantially quarter-circular cavities 66 therein which, together with the key slots 65, form what may broadly be termed as a bayonet slot in which key portions 67 projecting radially from diametrically opposed sides of a center post or clamping post or shaft 70 are adapted to be positioned, in a manner to be later described, for removably securing the lower end of the shaft or post 70 in the hub 62 of the base 59. The lower end of the hub 62 has a closure plate 71 suitably secured thereto for closing the cavities 66 in the hub 62.

The annular base 59 is supported on a plurality of legs adapted to rest upon the floor, there being three legs shown in this instance, including a front leg 73 and rear legs 74 and 75. The flanged upper ends of the legs 73, 74 and 75 are each suitably secured to the lower surface of a substantially circular boss portion 76 projecting radially from the annular base 60. The substantially circular bosses 76 are circularly arranged in substantially equally spaced relationship to each other.

It will be noted that the outer diameter of the annular portion 60 of the base 59 is only slightly less than the inner diameter of the bottom ring 16 of the outer mold matrix 10 and, although the flange 25 of the outer mold matrix 10 may rest in contact with the upper surface of the annular base 59 during the curing or molding operation, it is preferable that an annular bottom insulation ring 77, of substantially the same inner and outer diameter as that of the annular portion 60, is suitably secured to the upper surface of the base 59 in axial alinement therewith, not only in the interest of heat conservation, but to prevent the cast base 59 from becoming overheated to the extent that it would be uncomfortable for anyone to touch the same, besides causing heat to be radiated therefrom and unduly raising the temperature of the room in which the improved tire recapping machine is used.

It will be noted that the upper surface of that part of each of the bosses 76 which projects outwardly beyond the annular portion 60 of the base 59 is preferably disposed at a lower level than the mean upper level of the ring 60 to insure that the lower matrix ring 16 will permit the lower flange 25 of the outer mold matrix 10 to seat properly upon the lower insulation ring 77. The thickness of the insulation ring 77 may then be less than the thickness of the lower matrix ring 16.

Each of the legs 73, 74 and 75 has a relatively deep cavity 80 in the upper end thereof, which is closed by the corresponding boss portion 76 of the base 59, in each of which a compression spring 81 is positioned. The lower end of the compression spring 81 may rest upon the bottom of the cavity 80, if so desired, however, it is preferable that a spring base 82 is positioned between the lower end of the spring 81 and the bottom of the cavity 80.

The upper end of the compression spring 81 has a plunger pilot member 83 mounted thereon in which the lower end of a vertically movable plunger or lifting element 84 is suitably secured, as by a pressed fit. Each of the plungers 84 slidably penetrates the corresponding boss portion 76 of the base 59 and, also, loosely or slidably penetrates the bottom insulation ring 77. The pilot members 83 normally engage the lower surfaces of said bosses 76 to causes the upper ends of the plungers 84 to be disposed at a uniform level above the base 59. A plunger cap or lifting element cap 85 of a heat insulating material, such as compressed fiber-glass, is suitably secured to the upper end of each of the vertically movable plungers or lifting elements 84, the peripheral diameter of the cap 85 preferably being substantially the same as the diameter of the vertically movable plunger or lifting element 84.

In order to insure that the tire casing C remains properly axially alined relative to the mold member 11 after it has been inserted therein and the bead spreading wheels 30 and 31 have been removed therefrom, the outer surfaces of the vertically movable plungers or lifting elements 84 relative to the axis of the annular portion 60 should be substantially flush with the outer surface of the annular portion 60 of the base 59 and the insulation ring 77 or, in other words, slightly less than the inner diameter of the bottom ring 16 of the outer mold matrix 10.

The pressure collectively exerted by the springs 81 on the plungers or lifting elements 84 should be slightly greater than the combined weight of the outer mold matrix 10, the tire casing C, the air bag or tube T, the curing rim R and the bead separating or spreading unit, including the cylinder assembly 36 and the bead spreading wheels 30 and 31.

Thus, after the outer mold matrix 10 is positioned in the machine with its lower flange 25 resting upon the caps 85 of the vertically movable plungers or lifting elements 84 and after the tube T and the curing rim R have been inserted in the tire casing and the beads of the tire casing have been separated by means of the bead spreading unit to reduce the outside diameter of the casing C, the tire casing C may be inserted in the outer mold matrix 10 as shown in Figure 2. It will be noted in Figure 2 that, when the casing is in spread condition, the side walls diverge inwardly from the tread face and, if the lower flange 25 of the outer mold matrix 10 were resting upon the bottom or lower insulation ring 77 as the casing were inserted in the mold member 10, the lower side walls of the tire casing would contact the platform embodied in the lower insulation ring 77, preventing the tread portion of the casing from descending fully into the mold member 11.

However, since the insulation ring 77 and the base 59 are of annular construction and since the outer mold matrix 10 is held in lifted or raised position by the spring loaded vertically movable plungers or lifting elements 84, the median diametrical plane of the casing C may readily aline itself with the median diametrical plane of the mold member 11 when the pressure is subsequently released from the air cylinder tube 37, permitting the beads of the casing to approach and the diameter of the casing to increase until it obtains a frictional hold against the tread face of the mold.

The bead spreading wheels 30 and 31 and the air cylinder assembly 36 are then removed from the tire casing and the upper flange 27 positioned in the peripheral rabbet or groove 26 in the upper inner edge of the mold member 11. Now, one of the most important features of the present invention is the means for clamping the upper flange 27 in the peripheral groove 26 and simultaneously moving the outer mold matrix 10 downwardly to clamp the bottom or lower flange 25 of the outer mold matrix 10 against the base 59 or the insulation ring 77. Heretofore, a clamping member has been provided wherein it was necessary to first insert a post in the base, projecting upwardly through and beyond the upper surface of the outer mold matrix 10, and to then position the clamping member above the post and lower the same upon the post with the post extending through the hub of the clamping member. Thereafter, it has been necessary to threadably mount a nut on the upper end of the post to tighten the clamping member against the upper flange 27 of the outer mold matrix 10. Also, it has been necessary heretofore to release the prior types of lifting members to lower the bottom flange 25 of the outer mold matrix 10 against the base 59 of the machine before the clamping member was tightened against the upper surface of the outer mold matrix 10.

These latter operations have been time consuming, awkward and expensive to perform. Also, it has been necessary to provide suitable tracks suspended from the ceiling above the machine, with mechanical hoists mounted thereon for raising and lowering the clamping member. In many instances, the ceilings of some buildings in which the tire recapping machines were to be installed were so low that it has been impossible to install the machines due to the space required by the overhead tracks and the mechanical hoists and the additional space required in order to raise the upper clamping member sufficiently to clear the upper end of the center post. This has resulted in the necessity of constructing new buildings in which to install the types of recapping and retreading machines heretofore in use and such as that disclosed in said Patents Nos. 2,267,243 and 2,475,579.

In this instance, the clamping member, which may also be termed a turret, is broadly designated at 90 and comprises an annular clamping ring 91 which may bear directly against the upper surface of the upper flange 27 of the outer mold matrix 10. However, it is preferable that an upper insulation ring 92 is secured to the lower surface of the clamping ring 91 for the same reason that the lower insulation ring 77 is provided. The clamping ring 91 has cast integral therewith the outer ends of a plurality of radial spokes or arms 93 which curve upwardly and inwardly and are connected to a turret hub or clamping member hub 94 preferably cast integral with the spokes 93.

The center post or clamping shaft 70 axially slidably penetrates the hub 94 of the clamping member 90 and is threaded at its upper end for the reception of a clamping nut 95. The nut 95 is provided with a pair of handles 96 to facilitate tightening said nut against the upper end of the hub 94 when the key portions 67 at the lower end of the clamping shaft 70 is positioned in the cavities 66 of the bayonet slot in the hub 62 of the base 60. The upper end of the shaft 70 also has a handle 97 fixed therein to assist the operator in alining the key 67 with the key slots 65 in the hub 62 of the base 59 and by which the operator may rotate the shaft 70 substantially a quarter revolution to lock the key portions 67 in the cavities 66 of the bayonet slot. The handle 97 also serves as an indicator to the operator as to the position of the key portions 67 at the lower end of the shaft 70.

Now, in order to raise and lower the clamping member 90 and to simultaneously raise and lower the shaft 70 and nut 95 between the positions shown in Figures 3 and 5, each of a pair of diametrically opposed spokes 93 has an upwardly projecting portion 100, preferably cast integral therewith, and disposed intermediate the ends thereof, to which the front ends of a pair of levers 101 are pivotally connected, as at 102. The levers 101 extend upwardly and then rearwardly and are fulcrumed on a shaft 103 mounted in the upper end of bifurcated standard or pedestal 104. The pedestal 104 extends downwardly and is pivotally secured to the upper surface of an auxiliary base or rear deck 105 which rests upon the floor and also extends forwardly and is suitably secured to the lower surface of the annular platform or portion 60 of the base 59.

The levers 101 extend rearwardly and upwardly at an angle, beyond the pedestal 104, and have opposite ends of a clevis shaft 107 mounted therein on which a clevis 110 is pivotally mounted. The clevis 110 is fixed on the upper end of a piston rod 111 which extends downwardly and slidably penetrates the cylinder head 112 of a double-acting cylinder assembly or ram broadly designated at 113. Although an air cylinder or hydraulic is preferably employed as the means for raising and lowering the turret 93 in this instance, it is to be understood that any type of double-acting or reversible automatic motive force applying mechanism may be employed in lieu of the cylinder assembly 113.

The cylinder assembly 113 also comprises a cylinder tube 114 to which the upper end of the cylinder head 112 is secured and to the lower end of which a cylinder base 115 is suitably secured. The cylinder base 115 is fulcrumed on a shaft 116 carried by a cylinder pivot block 117 which extends forwardly and is suitably secured to the rear surface of the rear deck or auxiliary base 105. The lower end of the piston rod 111 is fixed to a piston 120 mounted for longitudinal sliding movement in the cylinder tube 114.

Figure 1:
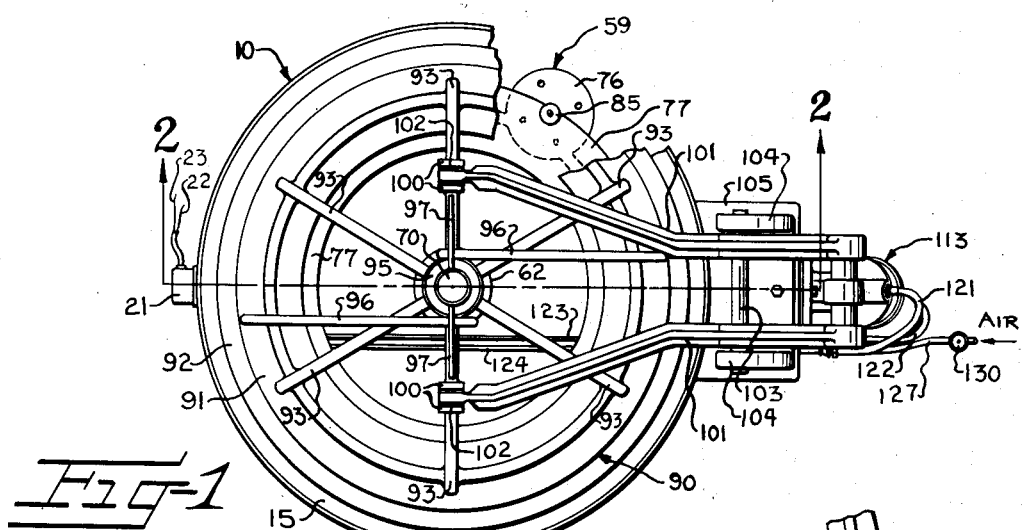
Figure 1 is a top plan view of the improved tire recapping and/or retreading apparatus.

The cylinder head 112 and cylinder base 115 have respective flexible pipes or hose 121 and 122 connected thereto for communication with the interior of the cylinder tube 114. The ends of the flexible pipes 121 and 122 remote from the cylinder assembly 113 are communicatively connected to corresponding ends of rigid pipes 123 and 124, respectively. It is evident, in Figure 1, that the rigid pipes 123 and 124 penetrate, and are supported by, the rear deck 105 and then extend forwardly past the hub 62 of the base 59.

The front ends of the pipes 123 and 124 are connected to opposite sides of a suitable four-way valve 125 to which a third air inlet pipe is connected. The pipe 126 also extends rearwardly through the rear deck 105 and is coupled to one end of a pipe 127 the other end of which is connected to a suitable source of compressed air, not shown. The pipe 127 has a pressure regulator valve 130 interposed therein for controlling the pressure of the compressed air as it enters the cylinder 113.

There are many different types of four-way valves which may serve the purpose of the valve 125, such as Schrader Valve No. 3214H. The valve 125 is shown schematically in Figure 8 and includes a movable core 131 which is manipulated by means of a lever or handle 132. The valve core 131 has passageways 133 and 134 therein and the housing of the valve 125 has the pipes 123, 124 and 126 connected thereto in such a manner that, at times, the passageway 134 registers with the pipes 123 and 126 while the passageway 133 registers with the pipe 124 and an air discharge outlet 135 provided in the housing of the valve 125. At other times, the passageway 134 registers with the pipe 123 and the air discharge outlet 135 while the passageway 133 registers with the pipes 124 and 126.

The valve 125 may be supported in any desired manner and, in this instance, the front leg 73 is provided with an outwardly projecting platform 136 upon which the valve 125 is suitably secured, thus making the valve control lever or handle 132 readily accessible to the operator.

In operation, assuming the passageway 133 is alined with pipes 124 and 126 and passageway 134 of the valve 125 is alined with pipe 123 and outlet 135, compressed air flows from the source through the pipe 127 and its regulator valve 130 and successively through the pipe 126, valve 125, pipes 124 and 121 to the upper end of the cylinder 113, thus causing the piston 120 and piston rod 111 to assume a lowered position in the cylinder tube 114. Thus, the turret 90, the shaft 70, the nut 95 and the levers 101 then occupy the position shown in Figure 5.

While the latter parts are in the position shown in Figure 5, the outer mold matrix 10 is positioned upon the lifting elements 84 and the tire casing C inserted therein in the manner heretofore described. As heretofore stated, the bead spreading wheels 30 and 31 are then removed from the tire casing C and the upper flange 27 of the outer mold matrix 10 is positioned in the peripheral groove 26 of the mold member 11. It is to be noted at this point that it has not been necessary to remove the shaft 70 and the nuts 95 from the clamping member or turret 90, since the nut 95 rests upon the hub 94 and supports the shaft 70 while the clamping member or turret 90 is in raised position as shown in Figure 5.

Now, in order to simultaneously clamp the pressure ring or flange 27 of the matrix 10 in position and to force the lower flange 25 against the insulation ring 77, it is merely necessary for the operator to manipulate the valve lever or handle 132 to so position the valve core 131 that the passageway 133 registers with the pipe 124 and the air discharge outlet 135 and so that the passageway 134 registers with the pipes 123 and 126. Thus, compressed air will then flow from the pipe 126 successively through the pipes 123 and 122 to the lower end of the cylinder assembly 113 to cause the piston 120 and piston rod 111 to move upwardly under pressure. Simultaneously therewith, the compressed air above the piston 120 will be discharged through the pipes 121 and 124, through the passageway 133 and the discharge outlet 135.

Since the piston rod 111 is moved upwardly under pressure, the levers 101 lower the clamping member or turret 90 and exert sufficient downward pressure on the clamping member or turret 90 so that, when the upper insulation ring 92 engages the flange 27 of the outer mold matrix 10, it overcomes the pressure exerted by the springs 81 on the lifting elements 84 and forces the matrix 10 downwardly until the lower flange 25 thereof engages the upper surface of the bottom insulation ring 77, to thereby clamp the upper flange 27 in the peripheral groove 26 in the mold member 11 while simultaneously clamping the outer mold matrix 10 in position on the base 59.

As the turret 90 is lowered, the key portions 69 on the lower end of the clamping shaft 70 are manually alined with the key slots 65 in the hub 62 of the base 59 and, after the outer mold matrix 10 has been clamped against the lower insulation ring 77, it is merely necessary for the operator to grasp the handle 97 and to rotate the shaft substantially a quarter revolution to lock the same in the bayonet slot in the hub 62 of the base 59.

It is thus seen that the present invention obviates the necessity of releasing the lifting elements 84, since they are automatically lowered by the pressure in the cylinder tube 114 as it forces the turret 90 downwardly against the upper surface of the outer mold matrix 10. Of course, after the curing process is completed, it is evident that, when the turret 90 is again released from the position shown in Figure 3 to substantially the position shown in Figure 5, the lifting elements 84 then automatically move to raised position to again lift the outer mold matrix 10 to a position spaced above the base 59 of the machine. The bead spreading unit is then again inserted in the tire casing C in the aforesaid manner, whereupon the tire casing is removed from the outer mold matrix 10 to complete a cycle in the operation of the improved tire recapping machine.

It is thus seen that a considerable saving may be realized in the operation of the present tire recapping machine as compared to tire recapping machines and apparatuses heretofore in use, such as those mentioned in said patents. Another economical feature of the present invention is the fact that it is merely necessary to rotate the nut 97 only a very few turns in order to loosen the key 67 sufficiently to rotate the shaft 70 to aline the key portions 67 with the key slots 65 prior to raising the turret 90 out of engagement with the outer mold matrix 10. Also, the depth of the cavities 66, forming the bayonet slot, in the hub 62 of the base 59 is only slightly greater than the length of the key portions 67 on the lower end of the shaft 70 and the operator may readily determine when the nut 95 has been loosened sufficiently, since the lower end of the nut will move upwardly away from the hub 95 of the turret 90 when the key portions 67 may be turned freely in the bayonet slot, since the lower end of the shaft 70 will then rest upon the closure plate 71.

It is to be noted that the provision of the plate 71 further facilitates initially positioning the nut 95 on the shaft 97, since the shaft 70 will be supported by the plate 71 and the nut may be easily turned on the threaded portion of the shaft 70 until it engages the hub 94 of the turret 90.

It is thus seen that we have provided a compact and simply operated machine for recapping and/or retreading tires and which is capable of use in association with a continuous undivided mold matrix with means to maintain the mold matrix in predetermined spaced relation above the base of the machine when the clamping member is in raised position and means being operable automatically to lower the means for maintaining said outer mold matrix in raised position as the clamping member is moved into clamping position.

In the drawings and specification there has been set forth a preferred embodiment of the invention and, although specific terms are employed, they are used in a descriptive and generic sense only, and not for purposes of limitation, the scope of the invention being defined in the claim.

We claim:

In a tire recapping apparatus having a base upon which an annular mold matrix provided with an annular shoulder on the lower end thereof is adapted to be positioned, the base of said machine also having an annular portion thereon of slightly less external diameter than the inner diameter of said shoulder and a clamping member disposed above said base adapted to be lowered to clamp the matrix against said base; the combination of a plurality of vertically movable circularly arranged lifting plungers carried by said base, the outer surfaces of said plungers being collectively concentric with the annular portion on the base and collectively arranged in such circular relationship as to engage the inner periphery of the annular shoulder on the matrix, and spring means normally urging said plungers upwardly to where the upper ends thereof are spaced substantially above the base for normally supporting said matrix in spaced relation above the base whereby the annular shoulder on the matrix is maintained concentric with the annular portion on the base as it engages the outer surfaces of the upper portions of the plungers so that, as the clamping member is lowered, the annular shoulder will be concentrically guided so as to concentrically encircle the periphery of the annular portion of the base.

References Cited in the file of this patent

UNITED STATES PATENTS

| | | |
|---|---|---|
| 1,867,734 | De Mattia | July 19, 1932 |
| 1,976,740 | McChesney | Oct. 16, 1934 |
| 2,184,119 | Glynn | Dec. 19, 1939 |
| 2,475,579 | Napier | July 5, 1949 |